(12) United States Patent
Lee

(10) Patent No.: US 9,407,193 B2
(45) Date of Patent: Aug. 2, 2016

(54) WIPER CONTROL APPARATUS OF VEHICLE

(71) Applicants: HYUNDAI MOTOR COMPANY, Seoul (KR); KIA MOTORS CORPORATION, Seoul (KR)

(72) Inventor: Jae-Jun Lee, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/562,544

(22) Filed: Dec. 5, 2014

(65) Prior Publication Data

US 2016/0118864 A1   Apr. 28, 2016

(30) Foreign Application Priority Data

Oct. 24, 2014   (KR) .......................... 10-2014-0145541

(51) Int. Cl.
| | |
|---|---|
| *H02P 1/04* | (2006.01) |
| *H02P 5/00* | (2016.01) |
| *H02P 7/00* | (2016.01) |
| *H02P 29/00* | (2016.01) |
| *H02K 11/00* | (2016.01) |
| *B60S 1/08* | (2006.01) |

(52) U.S. Cl.
CPC . *H02P 29/00* (2013.01); *B60S 1/08* (2013.01); *H02K 11/0068* (2013.01); *H02K 11/0089* (2013.01)

(58) Field of Classification Search
CPC .......... Y10S 318/02; B60S 1/08; B60S 1/482; B60S 1/0818; B60S 1/583; B60S 1/3406; B60S 1/44; H01H 67/06; H01H 13/12; H01H 67/16
See application file for complete search history.

(56) References Cited

U.S. PATENT DOCUMENTS

| | | | | |
|---|---|---|---|---|
| 4,355,270 A * | 10/1982 | Cook | ........................ | B60S 1/08 318/443 |
| 4,422,024 A * | 12/1983 | Itoh | .......................... | B60S 1/08 318/443 |
| 4,492,904 A * | 1/1985 | Graham | .................. | B60S 1/482 15/DIG. 15 |
| 4,673,853 A * | 6/1987 | Tsunoda | ................ | B60S 1/0807 15/250.17 |
| 4,689,535 A * | 8/1987 | Tsunoda | .................. | B60S 1/185 15/250.17 |
| 4,728,870 A * | 3/1988 | Hirano | ..................... | B60S 1/482 15/250.17 |
| 6,028,407 A * | 2/2000 | Yoshioka | .................. | B60S 1/08 318/280 |
| 6,304,047 B1 * | 10/2001 | Uchida | ..................... | B60S 1/08 15/250.12 |

(Continued)

FOREIGN PATENT DOCUMENTS

| | | |
|---|---|---|
| JP | 06-056003 A | 3/1994 |
| JP | 2004-148896 A | 5/2004 |

(Continued)

*Primary Examiner* — Marlon Fletcher
(74) *Attorney, Agent, or Firm* — McDermott Will & Emery LLP

(57) ABSTRACT

A wiper control apparatus includes a wiper motor for operating a wiper, and providing a ground terminal, a low-speed terminal, and a high-speed terminal. A cam plate is disposed inside the wiper motor and generates a control signal for stopping the wiper when an operation mode of the wiper is a stop mode. A controller is configured to selectively supply a power to a low-speed terminal and a high-speed terminal of the wiper motor by turning on/off of a low-speed relay and a high-speed relay according to an operation mode of the wiper, to selectively turn off the low-speed relay and the high-speed relay by using the control signal according to a rotation of the cam plate, and to decelerate a wiper speed when the wiper stops.

5 Claims, 5 Drawing Sheets

(56) References Cited

U.S. PATENT DOCUMENTS

2013/0037627 A1* 2/2013 Kikuta .................. B60S 1/485
                                                    239/284.1

FOREIGN PATENT DOCUMENTS

| JP | 2009-126383 A | 6/2009 |
| KR | 10-2009-0024872 A | 3/2009 |

* cited by examiner

WIPER CONTROL APPARATUS OF VEHICLE

CROSS-REFERENCE TO RELATED APPLICATION

This application claims the benefit of priority to Korean Patent Application No. 10-2014-0145541 filed in the Korean Intellectual Property Office on Oct. 24, 2014, the entire contents of which are incorporated herein by reference.

TECHNICAL FIELD

The present disclosure relates to a wiper control apparatus of a vehicle. More particularly, the present disclosure relates to a wiper control apparatus of a vehicle for preventing vibration of a wiper and overturning of a wiper rubber in an opposite direction.

BACKGROUND

A wiper control apparatus of a vehicle removes foreign materials staying on a windshield such as snow, rain, and mist to provide better view to a driver.

Generally, the wiper control apparatus includes a wiper motor providing power for rotating a wiper blade, a wiper switch selecting an operation mode of the wiper, and a controller controlling the wiper motor according to the operation mode of the wiper.

The operation of the wiper control apparatus is classified into a low-speed mode, a high-speed mode, and a stop mode.

In the low-speed mode, current is supplied to a low-speed terminal of the wiper motor, and the wiper blade is operated in a low speed. In the high-speed mode, current is supplied to a high-speed terminal of the wiper motor, and the wiper blade is operated in a high speed. In the stop mode, current supplied to the wiper motor is cut off, and wiper blade does not rotate.

However, according to the wiper control apparatus of conventional art, the wiper motor rapidly stops and the wiper blade vibrates when the operation mode of the wiper control apparatus enters the stop mode. Further, the wiper blade is rapidly stopped, and the wiper rubber provided in the wiper blade is overturned in an opposite direction.

When the wiper rubber is overturned in the opposite direction, the wiper rubber is exposed to sunlight of heat, the wiper rubber is hardened by the sunlight or heat. If the wiper rubber is hardened, noise is generated when the wiper rubber and the windshield are rubbed.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide a wiper control apparatus that prevent a wiper motor from suddenly stopping when a operation mode of a wiper control apparatus enters a stop mode.

Further, the present disclosure has been made in an effort to provide a wiper control apparatus that prevents a wiper rubber from being overturned in opposite direction by sudden stop of a wiper motor, and prevents the wiper rubber from being hardened by sunlight or heat.

A wiper control apparatus according to an exemplary embodiment of the present inventive concept may include a wiper motor for operating a wiper and providing a ground terminal, a low-speed terminal, and a high-speed terminal. A cam plate is disposed inside the wiper motor and generates a control signal for stopping the wiper when an operation mode of the wiper is a stop mode. A controller is configured to selectively supply a power to the low-speed terminal and the high-speed terminal of the wiper motor by turning on/off of a low-speed relay and a high-speed relay according to an operation mode of the wiper, to selectively turn off the low-speed relay and the high-speed relay by using a control signal according to a rotation of the cam plate, and to decelerate a wiper speed when the wiper is stopped.

The cam plate may include a P terminal selectively and electrically connected to the low-speed relay. A B terminal is electrically connected to a power terminal of a battery. A G terminal is electrically connected to a ground terminal of the wiper motor. The P terminal is selectively and electrically connected to the B terminal and G terminal while the cam plate rotates according to the operation mode of the wiper.

The cam plate may include a body portion having a first contact portion, a second contact portion, and a middle portion provided between the first contact portion and the second contact portion. A switching portion has a shape corresponding to the first contact portion, the second contact portion, and the middle portion of the body portion. The cam plate rotates when the operation mode of the wiper is a stop mode. The P terminal is turned on for a predetermined time while the P terminal and the B terminal are electrically connected by the switching portion corresponding to the first contact portion. The P terminal is turned off for a predetermined time while the P terminal and the G terminal are electrically connected by the switching portion corresponding to the middle portion. The P terminal is turned on for a predetermined time while the P terminal and the G terminal are electrically connected by the switching portion corresponding to the second contact portion.

The controller may turn off the high-speed relay after a first delay time elapses from when the P terminal is turned off by the middle portion of the cam plate, and turns off the low-speed relay after a second delay time elapse.

The first delay time and the second delay time may be less than a period of time during which the P terminal is turned off by the middle portion.

The P terminal and the G terminal may be electrically connected and the P terminal is turned off according to the rotation of the cam plate when the operation mode of the wiper is a low-speed mode or a high-speed mode.

One end of the low-speed relay may be electrically connected to the high-speed relay, and another end of the low-speed relay is selectively and electrically connected to a power terminal of a battery or the cam plate. One end of the high-speed relay is electrically connected to the low-speed relay, and another end of the high-speed relay is selectively and electrically connected to the low-speed terminal or the high-speed terminal of the wiper motor.

According to the exemplary embodiment of the present inventive concept, since the low-speed relay and the high-speed relay are controlled by the control signal generated by rotation of the cam plate, the wiper stops after the rotation speed of the wiper is reduce.

Further, since the wiper is stopped after the rotation speed of the wiper is reduced, the wiper rubber provided in the wiper is not overturned or does not vibrate.

BRIEF DESCRIPTION OF THE DRAWINGS

The drawings are provided for reference in describing exemplary embodiments of the present inventive concept and the spirit of the present inventive concept should not be construed only by the accompanying drawings.

DETAILED DESCRIPTION OF THE EMBODIMENTS

Figure 1:
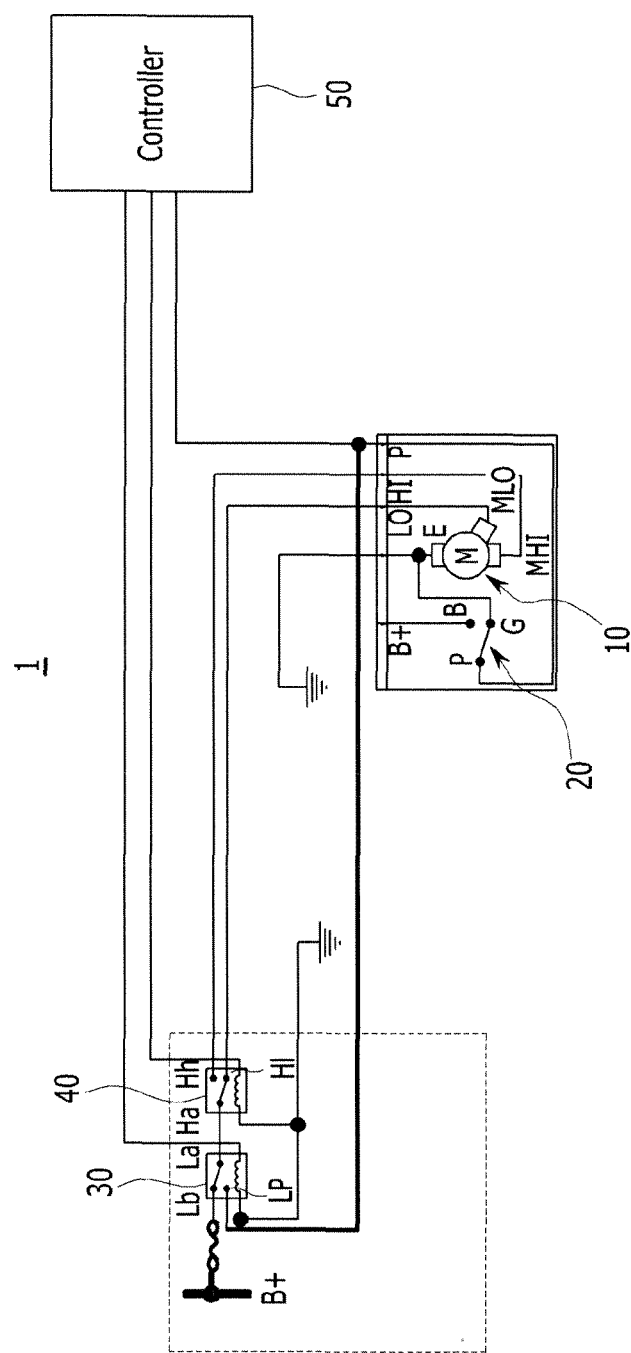
FIGS. 1 to 3 are circuit diagrams illustrating a wiper control apparatus according to an exemplary embodiment of the present inventive concept.

The present inventive concept will be described more fully hereinafter with reference to the accompanying drawings, in which exemplary embodiments of the invention are shown. As those skilled in the art would realize, the described embodiments may be modified in various different ways, all without departing from the spirit or scope of the present inventive concept.

In describing the present disclosure, parts that are not related to the description will be omitted. Like reference numerals generally designate like elements throughout the specification.

In addition, the size and thickness of each configuration shown in the drawings are arbitrarily shown for better understanding and ease of description, but the present disclosure is not limited thereto. In the drawings, the thickness of layers, films, panels, regions, etc., are exaggerated for clarity.

Hereinafter, a wiper control apparatus according to an exemplary embodiment of the present inventive concept will be described in detail with reference to accompanying drawings.

Figure 2:
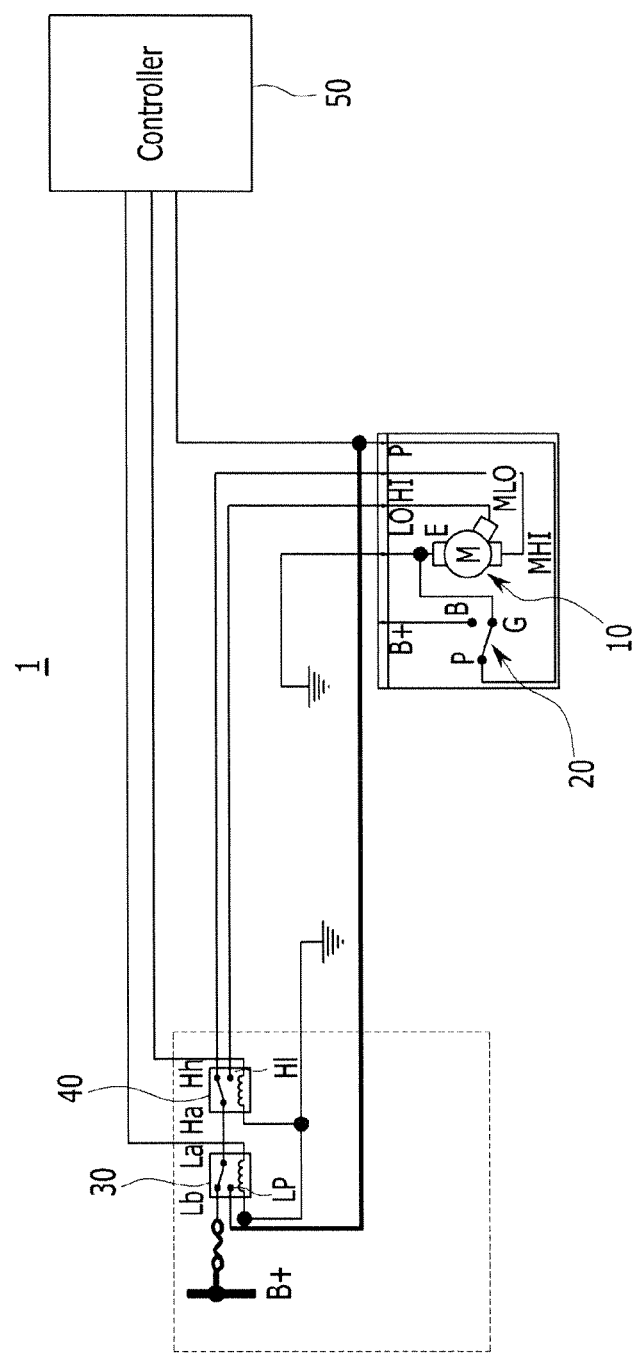
Figure 3:
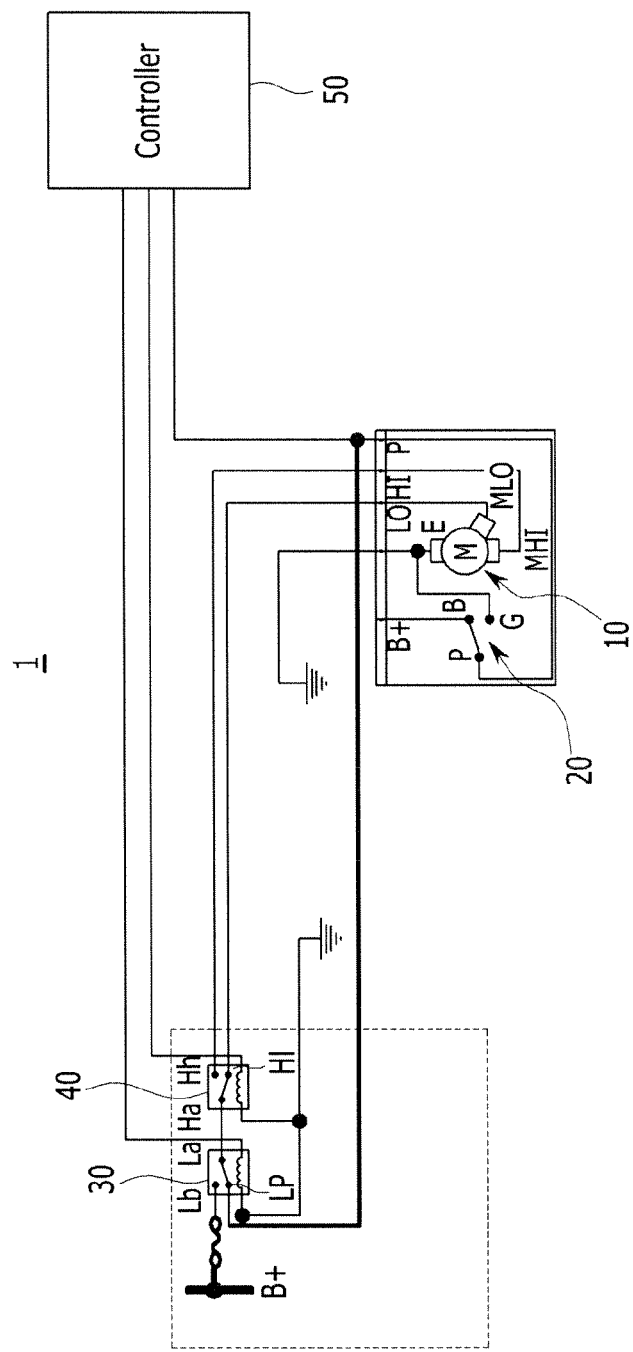

FIGS. 1 to 3 are circuit diagrams illustrating a wiper control apparatus according to an exemplary embodiment of the present inventive concept.

As shown in FIGS. 1 to 3, a wiper control apparatus according to an exemplary embodiment of the present inventive concept includes a wiper motor 10, a low-speed relay 30, a high-speed relay 40, and a controller 50 controlling the wiper motor 10, the low-speed relay 30, and the high-speed relay 40.

The wiper motor 10 supplies power for operating a wiper. A ground terminal (E), a low-speed terminal (MLO), and a high-speed terminal (MHI) are provided in the wiper motor 10. A cam plate 20 is provided in an output shaft of the wiper motor 10.

As shown in FIGS. 4(a)-4(d), the cam plate 20 is a kind of switch, the cam plate 20 rotates, and a stop signal is generated for an operation mode of the wiper is a stop mode. Three fixed terminals (P, B, G) are provided in the cam plate 20, two fixed terminals (P-B, P-G) are selectively and electrically connected by the rotation of the cam plate 20.

The low-speed relay 30 and the high-speed relay 40 are connected in series. The controller 50 controls the low-speed relay 30 and the high-speed relay 40 to be turned on/off according to the operation mode of the wiper, and controls a rotation speed of the wiper by selectively supplying power to the low-speed terminal and the high-speed terminal of the wiper motor 10.

The controller 50 may be implemented with one or more microprocessors operated by a predetermined program or hardware including the microprocessor, and the predetermined program includes a series of commands for performing a control method of the wiper control apparatus according to an exemplary embodiment of the present inventive concept to be described below.

One end (Lb terminal) of the low-speed relay 30 is electrically connected to HO terminal of the high-speed relay 40, and another end of the low-speed relay 30 is electrically connected to a power terminal of a battery or the P terminal of the cam plate 20 (i.e., LO-Lb or LO-Lp).

FIGS. 4(a)-4(d) are drawings illustrating connection status of each terminal with respect to rotation of a cam plate according to an exemplary embodiment of the present inventive concept.

As shown in FIGS. 4(a)-4(d), the cam plate 20 has a circle shape, and includes a body portion 27, and a first contact portion 21 and second contact portion 23 concavely formed in the body portion 27. The first contact portion 21 and the second contact portion 23 are separated in a predetermined distance, and a middle portion 23 is concavely formed between the first contact portion 21 and the second contact portion 23. A switching portion 29, which is formed as a shape corresponding to the first contact portion 21, the second contact portion 23, and the middle portion 23, is provided in the body portion 27. That is, a first switching portion 29a corresponding to the first contact portion 21, a second switching portion 29b corresponding to the second contact portion 23, and a third switching portion 29c corresponding to the third contact portion 25 are formed in the switching portion 29.

The body portion 27 and the switching portion 29 are made of a conductor such as a metal. And the body portion 27 and the switching portion 29 are insulated each other. The fixed terminals (P-B, P-G) are selectively and electrically connected by the body portion 27 and the switching portion 29 while the cam plate rotates.

Figure 4:
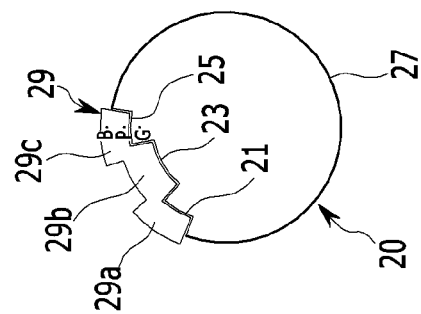
FIGS. 4(a)-4(d) are drawings illustrating connection status of each terminal with respect to rotation of a cam plate according to an exemplary embodiment of the present inventive concept.
Figure 4:
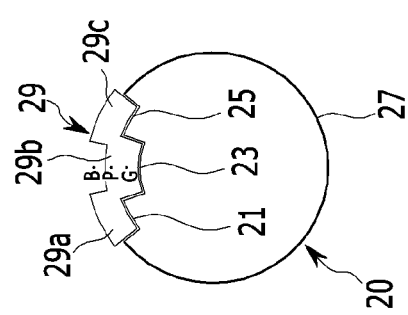
Figure 4:
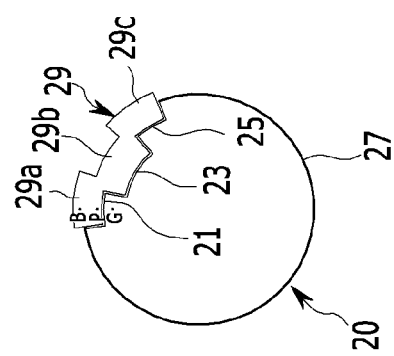
Figure 4:
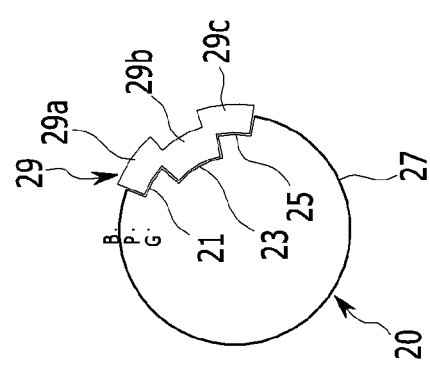

As shown in FIG. 4(a), the cam plate 20 does not rotate when the operation mode of the wiper is a low-speed mode or a high-speed mode. Therefore, the P terminal and the G terminal (ground terminal) are electrically connected by the body portion 27 (i.e., the P terminal is turned off).

As shown in FIGS. 4(b) and 4(c), the P terminal is sequentially and electrically connected to the G terminal (ground terminal) and the B terminal (power terminal) by the body portion 27 and the switching portion 29 while the cam plate 20 rotates when the operation mode of the wiper is a stop mode.

That is, as shown in FIG. 4(b), when a signal according to the stop mode is supplied to the wiper control apparatus, the cam plate 20 is rotated in a counterclockwise direction (based on FIGS. 4(a)-4(d)), the P terminal is turned on for a predetermined time by the first switching portion 29a corresponding to the first contact portion 21. In other words, the P terminal and the B terminal (power terminal) are electrically connected.

When the cam plate 20 continuously rotates, referring to FIG. 4(c), the P terminal is turned off for a predetermined time by the second switching portion 29b corresponding to the middle portion 23. In other words, the P terminal and the G terminal (ground terminal) are electrically connected by the second switching portion 29b.

When the cam plate 20 further rotates, as shown in FIG. 4(d), the P terminal is turned on for a predetermined time by the third switching portion 29c corresponding to the second contact portion 23. In other words, the P terminal and the B terminal (power terminal) are electrically connected by the third switching portion 29c.

Hereinafter, an operation of the wiper control apparatus according to an exemplary embodiment of the present inventive concept will be described in detail with reference to accompanying drawings. First, the operation of the wiper control apparatus will be described when the operation mode of the wiper is the low-speed mode.

As shown in FIG. 1, when the operation mode of the wiper is the low-speed mode, the controller 50 controls the low-speed relay 30 to be turned on, and connects to the power terminal (B+) of the battery. The controller 50 controls the high-speed relay 40 to be turned off, and thereby, the power terminal (B+) is connected to the low-speed terminal (MLO) of the wiper motor 10. At this time, since the cam plate 20 does not rotate, the P terminal of the cam plate 20 is electrically connected to the G terminal (i.e., the P terminal is turned off). Therefore, power of the battery is supplied from the power terminal of the battery to the low-speed terminal of the wiper motor 10, and the wiper is rotated at low speed.

Next, the operation of the wiper control apparatus will be described when the operation mode of the wiper is the high-speed mode.

As shown in FIG. 2, when the operation mode of the wiper is the high-speed mode, the controller 50 controls the low-speed relay 30 to be turned on, and connects to the power terminal (B+) of the battery. And the controller 50 controls the high-speed relay 40 to be turned on, and thereby the power terminal ($B_+$) of the battery is connected to the high-speed terminal (MHI) of the wiper motor 10. At this time, since the cam plate 20 does not rotate, the P terminal of the cam plate 20 is electrically connected to the G terminal (i.e., the P terminal is turned off). Therefore, the batter power is supplied from the power terminal of the battery to the high-speed terminal of the wiper motor 10, and the wiper rotates at a high speed.

Next, the operation of the wiper control apparatus will be described when the operation mode of the wiper is the stop mode.

FIGS. 4(a)-4(d) are drawings illustrating connection status of each terminal with respect to rotation of a cam plate according to an exemplary embodiment of the present inventive concept.

Connection status of the P terminal, the B terminal, and the G terminal according to the rotation of the cam plate 20 will be described when the operation mode of the wiper is the stop mode.

As shown in FIG. 4(a), when the operation mode of the wiper is the low-speed mode or the high-speed mode, the cam plate 20 is not rotated, the P terminal and the G terminal are electrically connected (i.e., P terminal is turned off).

When the operation mode of the wiper is the stop mode, as shown in FIG. 4(b), the cam plate 20 rotates in a counter-clockwise direction. When the cam plate 20 rotates in a counterclockwise direction, the P terminal and the B terminal are electrically connected by the first switching portion 29a corresponding to the first contact portion 21 (i.e., the P terminal is turned on).

When the cam plate 20 further rotates, as shown in FIG. 4(c), the P terminal and the G terminal are electrically connected by the second switching portion 29b corresponding to the middle portion 23 (i.e., the P terminal is turned off).

When the cam plate 20 further rotates, as shown in FIG. 4(d), the P terminal and the B terminal are electrically connected by the third switching portion 29c corresponding to the second contact portion 23 (i.e., the P terminal is turned on).

As described above, when the operation mode of the wiper is the stop mode, the P terminal is sequentially and electrically connected to the B terminal and the G terminal by the first contact portion 21, the middle portion 23, and the second contact portion 23, and thereby, the P terminal is sequentially turned on and off.

Hereinafter, when the operation mode of the wiper is the stop mode, the control method of the low-speed relay 30 and high-speed relay 40 according to rotation of the cam plate 20 will be described with reference to FIG. 3 and FIG. 5.

Referring to FIG. 3, when the operation mode of the wiper is the stop mode, the controller 50 controls the low-speed relay 30 to be turned off, and thereby, the LP terminal of the low-speed relay 30 is connected to the P terminal of the cam plate. The controller 50 controls the high-speed relay 40 to be turned off, and thereby, the P terminal of the cam plate is connected to the low-speed terminal (MLO) of the wiper motor.

At this time, control step of the low-speed relay 30, the high-speed relay 40, and the cam plate 20 according to time are as follows.

Figure 5:
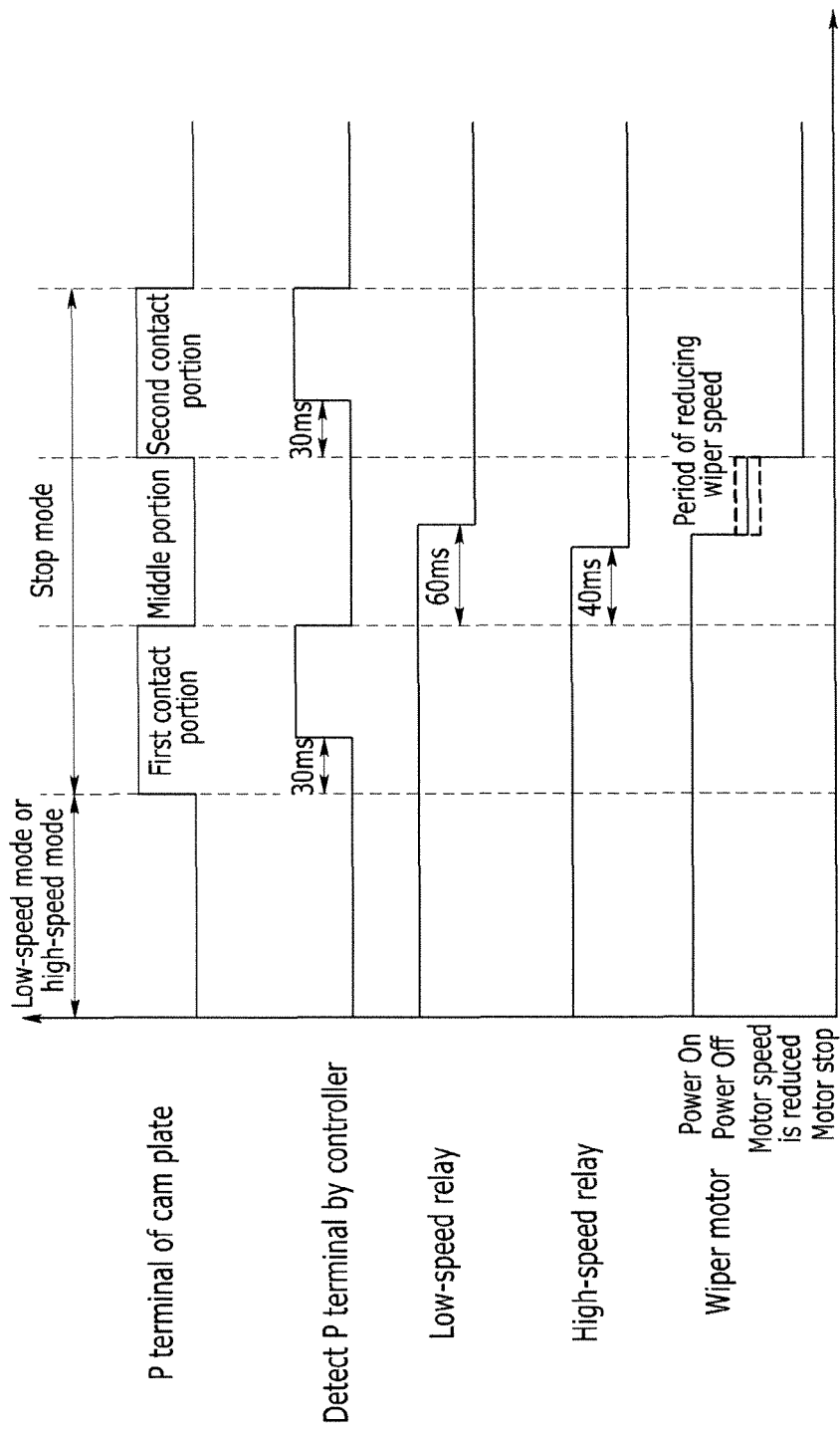
FIG. 5 is a timing diagram of a wiper control apparatus according to an exemplary embodiment of the present inventive concept.

As shown in FIG. 5, when the controller 50 detects that the P terminal is turned off after the P terminal is turned on by the rotation of the cam plate 20 (i.e., the controller detect that the P terminal is turned off by the middle portion 23), the controller 50 controls the high-speed relay 40 to be turned off after a first delay time (for example, 40 ms).

When the controller 50 detects that the P terminal is turned off after the P terminal is turned on (i.e., the controller detect that the P terminal is turned off by the middle portion 23), the controller 50 controls the low-speed relay 30 to be turned off after a second delay time (for example, 60 ms).

At this time, the second delay time may be greater than the first delay time.

As described above, when the high-speed relay 40 and the low-speed relay 30 are sequentially turned off after the predetermined time elapses from when the P terminal is turned off, power supplied to the wiper motor 10 is cut off. Particularly, since each terminal is electrically connected in order of 'G terminal—P terminal—Lp terminal—LA terminal—HA terminal—HL terminal—MLO terminal', power is not supplied to the low-speed terminal (MLO terminal) of the wiper motor 10. That is, the low-speed terminal (MLO terminal) of the wiper motor 10 is electrically connected to the ground terminal. Therefore, the wiper motor 10 rotates by only inertial energy, and the rotation speed of the wiper motor 10 is reduced.

When the P terminal is turned on by the second contact portion 23, both end of the wiper motor 10 form equipotential. Particularly, since each terminal is electrically connected in order of 'P terminal (power terminal of battery)—P terminal—Lp terminal—LA terminal—HA terminal—HL terminal—MLO terminal, power of the battery is supplied to the low-speed terminal (MLO) of the wiper motor 10 and the ground terminal of the wiper motor 10, and thereby, the ground terminal of the wiper motor 10 and the low-speed terminal of the wiper motor 10 form equipotential. Therefore, the wiper motor 10 is stopped.

As such, according to an exemplary embodiment of the present inventive concept, when the operation mode of the wiper is the stop mode, the rotation speed of the wiper is reduce for a predetermined time and the wiper is stopped. Therefore, since the wiper is not suddenly stopped, it can be prevented that the wiper blade is vibrated or overturned.

While this inventive concept has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A wiper control apparatus comprising:
   a wiper motor for operating a wiper, and having a ground terminal, a low-speed terminal, and a high-speed terminal;
   a cam plate disposed inside the wiper motor, and generating a control signal for stopping the wiper when an operation mode of the wiper is a stop mode; and
   a controller configured to selectively supply a power to the low-speed terminal and the high-speed terminal of the wiper motor by turning on/off of a low-speed relay and a high-speed relay according to the operation mode of the wiper, to selectively turn off the low-speed relay and the high-speed relay by using the control signal according to a rotation of the cam plate, and to decelerate a wiper speed when the wiper stops,
   wherein the cam plate includes: a P terminal selectively and electrically connected to the low-speed relay; a B terminal electrically connected to a power terminal of a battery; and a G terminal electrically connected to the ground terminal of the wiper motor,
   wherein the P terminal is selectively and electrically connected to the B terminal and the G terminal while the earn plate rotates according to the operation mode of the wiper,
   wherein the cam plate includes:
   a body portion having a first contact portion, a second contact portion, and a middle portion provided between the first contact portion and the second contact portion;
   a switching portion having a shape corresponding to the first contact portion, the second contact portion, and the middle portion of the body portion,
   wherein the cam plate rotates when the operation mode of the wiper is the stop mode,
   the P terminal is turned on for a predetermined time while the P terminal and the B terminal are electrically connected by the switching portion corresponding to the first contact portion,
   the P terminal is turned off for a predetermined time while the P terminal and the G terminal are electrically connected by the switching portion corresponding to the middle portion, and
   the P terminal is turned on for a predetermined time while the P terminal and the G terminal are electrically connected by the switching portion corresponding to the second contact portion.

2. The wiper control apparatus of claim 1,
   wherein the controller turns off the high-speed relay after a first delay time elapses from the time when the P terminal is turned off by the middle portion of the cam plate, and turns off the low-speed relay after a second delay time elapses.

3. The wiper control apparatus of claim 2,
   wherein the first delay time and the second delay time are less than a period of time during which the P terminal is turned off by the middle portion.

4. The wiper control apparatus of claim 1,
   wherein the P terminal and the G terminal are electrically connected and the P terminal is turned off according to the rotation of the cam plate when the operation mode of the wiper is a low-speed mode or a high-speed mode.

5. The wiper control apparatus of claim 1,
   wherein one end of the low-speed relay is electrically connected to the high-speed relay, and another end of the low-speed relay is selectively and electrically connected to the power terminal of the battery or the cam plate,
   one end of the high-speed relay is electrically connected to the low-speed relay, and another end of the high-speed relay is selectively and electrically connected to the low-speed terminal or the high-speed terminal of the wiper motor.

* * * * *